United States Patent
Riggs (10) Patent No.: US 8,767,791 B2
(45) Date of Patent: Jul. 1, 2014

(54) SYSTEM AND METHOD FOR CONTROLLING GAS CONCENTRATION IN A TWO-CHAMBER GAS DISCHARGE LASER SYSTEM

(75) Inventor: Daniel J. Riggs, San Diego, CA (US)

(73) Assignee: Cymer, LLC, San Diego, CA (US)

(*) Notice: Subject to any disclaimer, the term of this patent is extended or adjusted under 35 U.S.C. 154(b) by 255 days.

(21) Appl. No.: 13/098,259

(22) Filed: Apr. 29, 2011

(65) Prior Publication Data

US 2012/0275481 A1 Nov. 1, 2012

(51) Int. Cl.
*H01S 3/22* (2006.01)

(52) U.S. Cl.
USPC .................................. 372/59; 372/55; 372/60

(58) Field of Classification Search
USPC ................................. 372/59, 55, 60
See application file for complete search history.

(56) References Cited

U.S. PATENT DOCUMENTS

| | | |
|---|---|---|
| 5,440,578 A | 8/1995 | Sandstrom |
| 5,450,436 A | 9/1995 | Mizoguchi |
| 6,130,904 A | 10/2000 | Ishihara |
| 6,727,731 B1 | 4/2004 | Rebhan et al. |
| 6,738,406 B2 | 5/2004 | Vogler |
| 6,879,617 B2 * | 4/2005 | Ariga et al. .............. 372/55 |
| 7,039,086 B2 | 5/2006 | Fallon |
| 7,079,564 B2 | 7/2006 | Fallon |
| 7,209,507 B2 | 4/2007 | Rule |
| 7,277,464 B2 | 10/2007 | Rule |
| 7,596,164 B2 | 9/2009 | Fallon |
| 7,741,639 B2 | 6/2010 | Besaucele |
| 7,835,414 B2 | 11/2010 | Dunstan |
| 2008/0205472 A1 | 8/2008 | Dunstan et al. |

* cited by examiner

*Primary Examiner* — Yuanda Zhang
(74) *Attorney, Agent, or Firm* — Gard & Kaslow LLP (57) ABSTRACT

Methods and systems for controlling the gas concentrations in the chambers of a two chamber gas discharge laser such as an excimer laser are disclosed. A first set of inject opportunities is selected for the laser chamber of the master oscillator, and a second set of inject opportunities is selected for the laser chamber of the power amplifier. At each selected inject opportunity for the master oscillator, its laser chamber receives an inject containing a fixed amount of a non-halogen containing gas, and a calculated amount of a halogen containing gas. At the selected inject opportunities for the power amplifier, its laser chamber receives a fixed amount of the halogen containing gas, and may also receive a fixed amount of the non-halogen containing gas.

21 Claims, 5 Drawing Sheets

SYSTEM AND METHOD FOR CONTROLLING GAS CONCENTRATION IN A TWO-CHAMBER GAS DISCHARGE LASER SYSTEM

FIELD OF THE INVENTION

The present invention relates generally to laser systems. More specifically, the invention relates to methods and systems for controlling the gas concentrations in the chambers of a two chamber gas discharge laser.

BACKGROUND OF THE INVENTION

One type of gas discharge laser used in photolithography is known as an excimer laser. An excimer laser typically uses a combination of a noble gas, such as argon, krypton, or xenon, and a reactive gas such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called MOPA (Master Oscillator Power Amplifier) lasers. In addition to improving the spectral bandwidth and pulse energy, the efficiency of the dual chamber architecture can enable the consumable modules in MOPA lasers to reach longer operational lifetimes than their counterpart modules in single chamber light sources.

The higher pulse energy generation of a dual-chamber excimer laser further minimizes costs by reducing the total number of pulses fired for a given exposure layer, since each pulse is fired at a higher pulse energy compared to single chamber light sources. Within a single burst, the same amount of energy can be fired using fewer pulses. With fewer pulses fired, consumable modules will have a longer operational lifetime. Further, given the increased efficiency of the MOPA design, such lasers typically operate at a lower starting voltage than single chamber light sources.

In each chamber, as the light source discharges energy across its electrodes to produce light, the halogen gas, fluorine in the case of ArF or KrF lasers, is depleted. This causes a decrease in the laser efficiency seen, for example, as an increase in discharge voltage required to create a constant pulse energy. Since the discharge voltage has an upper limit, steps must be taken to replenish the lost fluorine so that the laser continues to function properly.

One way to do this is with a full replenishment of the gas in the chamber, called a refill, where all of the gas is replaced while the laser is not firing to return the gas content in the chamber to the desired mix and concentration. However, refills are extremely disruptive as not only must the laser be shut off during the refill process, but the lithographic exposure of chips must also be paused in a controlled manner at the same time and then restarted when the laser is again operational to avoid improper processing of the chips.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One way of doing this is by performing a partial replenishment of the gas in the chambers, known as an inject, rather than a full refill. As long as the laser is able to continue to operate within certain parameters, it is not necessary to shut the laser down for the inject, and thus processing of chips may continue during the inject process.

A number of prior methods and systems have been described for managing injects, including, for example, how to determine when an inject should occur and the amount of halogen gas to be provided by the inject. See, for example, U.S. Pat. Nos. 7,741,639 and 7,835,414, owned by the assignee of the present application. However, until now it has been believed that all such methods and systems still require either continuous measurement or estimation of the halogen gas consumption in both the master oscillator and power amplifier chambers and calculation of the amount of gas to be injected into each, as well as closed-loop operation including feedback.

SUMMARY OF THE INVENTION

Methods and systems for controlling the gas concentrations in the chambers of a two chamber gas discharge laser such as an excimer laser are disclosed. A first set of inject opportunities is selected for the laser chamber of the master oscillator, and a second set of inject opportunities is selected for the laser chamber of the power amplifier. At each selected inject opportunity for the master oscillator, its laser chamber receives an inject containing a fixed amount of a non-halogen containing gas, and a calculated amount of a halogen containing gas. At the selected inject opportunities for the power amplifier, its laser chamber receives a fixed amount of the halogen containing gas, and may also receive a fixed amount of the non-halogen containing gas.

In one embodiment, a dual chamber gas discharge laser light source is described, comprising: a master oscillator having a laser chamber containing a lasing medium gas comprising a halogen; an amplifier having a laser chamber containing a lasing medium gas comprising a halogen; and a gas replenishment system including a controller executing a replenishment scheme at inject opportunities occurring at regular intervals, the replenishment scheme comprising injecting into the master oscillator laser chamber at each inject opportunity gas containing a fixed quantity of a non-halogen containing gas, and during at least one inject opportunity a halogen containing gas in a calculated amount, and injecting into the amplifier laser chamber at each inject opportunity a fixed amount of the halogen containing gas.

In another embodiment, a method of replenishing gas in a dual chamber gas discharge laser light source having a master oscillator and an amplifier is described, each of the master oscillator and amplifier having a laser chamber containing a lasing medium gas comprising a halogen, the method comprising the steps of: selecting a plurality of inject opportunities occurring at regular intervals; injecting into the master oscillator laser chamber at each inject opportunity gas containing a fixed quantity of a non-halogen containing gas, and during at least one inject opportunity a halogen containing gas in a calculated amount; and injecting into the amplifier laser chamber at each inject opportunity a fixed amount of the halogen containing gas.

Still another embodiment discloses a non-transitory computer-readable medium having embodied thereon a program, the program being executable by a processor to perform a method of replenishing gas in a dual chamber gas discharge laser light source having a master oscillator and an amplifier, each of the master oscillator and amplifier having a laser chamber containing a lasing medium gas comprising a halogen, the method comprising the steps of: selecting a plurality of inject opportunities occurring at regular intervals; injecting into the master oscillator laser chamber at each inject opportunity gas containing a fixed quantity of a non-halogen containing gas, and during at least one inject opportunity a halogen containing gas in a calculated amount; and injecting into the amplifier laser chamber at each inject opportunity a fixed amount of the halogen containing gas.

DETAILED DESCRIPTION OF THE INVENTION

The present application describes a method and system for controlling gas concentration in a two-chamber gas discharge laser system such as a MOPA excimer laser. The control of fluorine concentration in the power amplifier is simplified by injecting fixed amounts of fluorine at appropriate intervals in an open-loop configuration that does not require feedback, rather than measuring or continuously estimating the actual fluorine consumption in the power amplifier.

Figure 1:
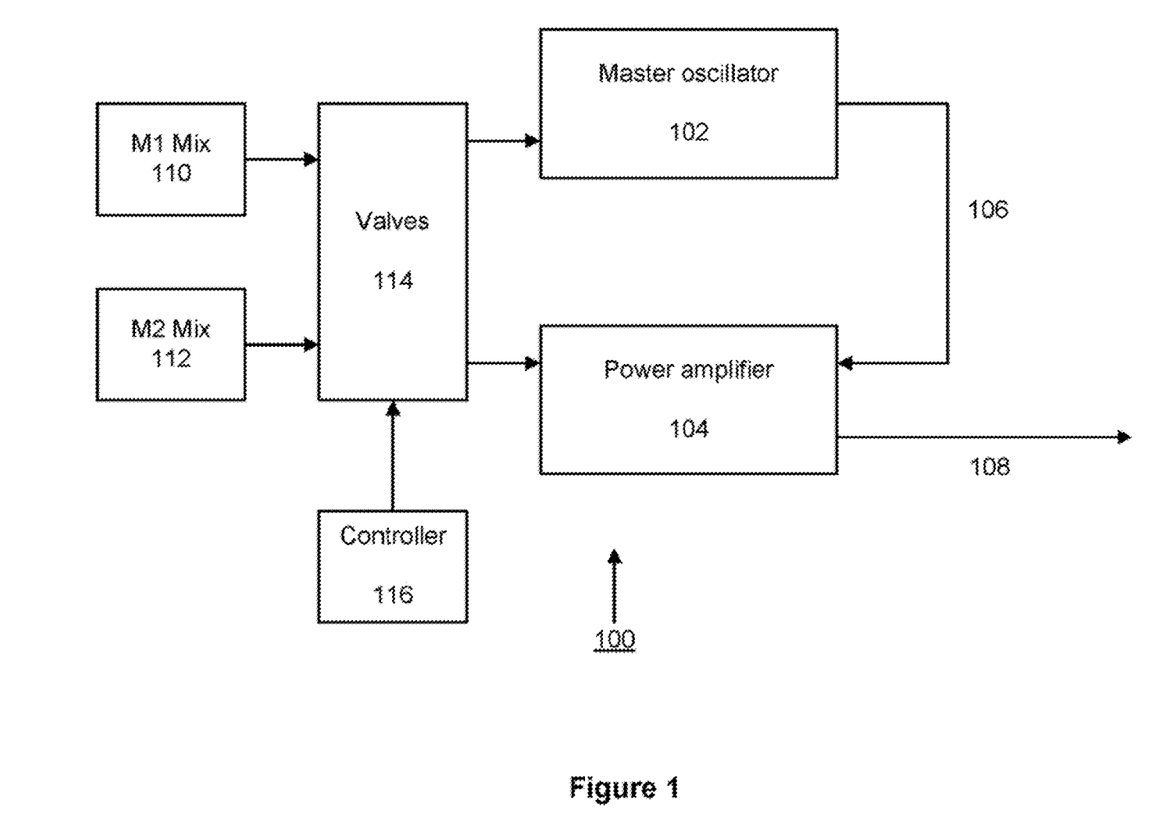
FIG. 1 shows a simplified block diagram of a gas replenishment system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a laser chamber, and a power amplifier 104 also containing a laser chamber. In operation, the master oscillator 102 produces a first laser beam 106 which is passed to the power amplifier 104 where it is amplified, to produce a second laser beam 108 which is output to a scanner machine (not shown) for use in lithography.

There is a short delay between the electrical discharge that causes production of the first laser beam 106 by the master oscillator 102, and the discharge that causes production of the second laser beam 108 by the power amplifier 104. This time delay is referred to as $\Delta T_{MOPA}$, or dtMOPA. For a given laser, there will generally be a value of dtMOPA that is considered optimum, which is a strong function of fluorine concentration and which also changes with time. This optimum dtMOPA varies from laser to laser, sometimes being in the range of tens of nanoseconds, and may be determined by the use of estimators that are known to those of skill in the art.

Each laser chamber contains a mixture of gases; for example, in a given excimer laser each laser chamber might contain a halogen, e.g., fluorine, along with other gases such argon, neon, and possibly others in different partial pressures that add up to a total pressure P. Gas bottles 110 and 112 are connected to the master oscillator 102 and power amplifier 104 through valves 114 to allow for replenishment of the gas in the laser chambers when desired. Gas bottle 110 typically might contain a mixture of gases including fluorine, argon and neon, known as an "M1 mix," while gas bottle 112 might contains a mixture of argon, neon and/or other gases, but no fluorine, known as an "M2 mix." A controller 116, such as a processor or logic circuit, operates the valves 114 to inject gases from bottles 110 and 112 into the master oscillator 102 and power amplifier 104 based upon certain data as described further herein.

As is known in the art, two bottles of gas are needed, since the fluorine in gas bottle 110 is at a particular partial pressure that is typically higher than that desired for laser operation. In order to inject the fluorine into the master oscillator 102 or power amplifier 104 at a desired lower partial pressure, the gas in bottle 110 must be diluted, and the non-halogen containing gas in bottle 112 is used for this purpose.

As mentioned above, fluorine is consumed during operation of the laser. The resulting decrease in fluorine concentration typically causes a rise in the discharge voltage required to produce a laser pulse. In addition, changes in fluorine concentration also affect dtMOPA, the delay time between the electrical discharges that cause production of the first laser beam 106 and the second laser beam 108.

Thus, the fluorine concentration must be replenished to keep the laser operating within desired parameters. Further, a satisfactory partial pressure of fluorine must be maintained while keeping the gas content in each laser chamber at a fixed pressure. Again, this is sometimes done by injects, i.e., partial replenishment of the gas in the chamber, rather than a full refill in which the chamber is purged and the gas completely replaced.

As with full refills, the injects are typically done at fixed intervals, determined either by elapsed time between injects, or by the number of "shots," i.e., pulses of the laser, that have been generated. In some embodiments, injects are done in each chamber after approximately every 1 million pulses by that chamber. For easier operation, the injects to the laser chambers are staggered, so that while each chamber receives an inject after about each million pulses, the power amplifier 104 receives an inject approximately 500,000 pulses after the master oscillator 102 receives an inject, and vice versa.

However, while a full refill simply replaces all of the gas in the laser chamber, an inject is intended mainly to replace the amount of halogen gas, such as fluorine, that has been consumed since the last refill or inject. Since it is mostly the halogen gas that is consumed during operation, the injects to the laser chambers in both the master oscillator and power amplifier typically include a fixed amount of the M2 mix, which contains no halogen, and an amount of M1 mix containing enough halogen to replace the halogen which has been estimated to have been consumed.

Figure 2:
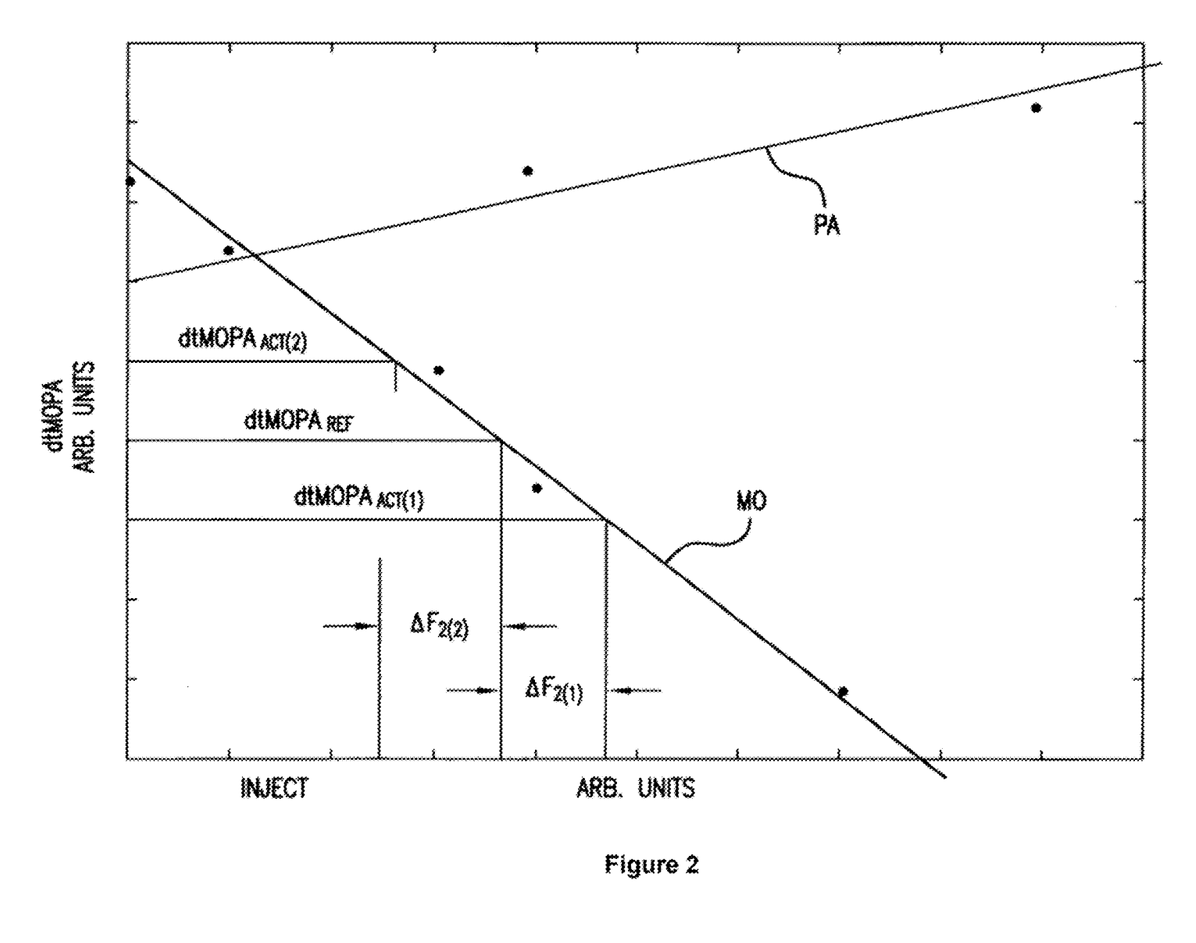
FIG. 2 is a graph of the relationship between the difference in discharges in a master oscillator and a power amplifier ("dtMOPA") and changes in fluorine concentration in the laser chambers in an exemplary MOPA excimer laser.

FIG. 2 shows a representative plot of changes in the timing between the electrical discharges that cause production of the laser beam 106 by the master oscillator and the amplified laser beam 108 by the power amplifier, i.e., dtMOPA (vertical axis), that result changes in the amount of fluorine ($F_2$) in the chamber (horizontal axis), and thus an indication of an amount of fluorine, consumed in each chamber in an exemplary MOPA excimer laser. It may be seen that decreases in the fluorine level in the power amplifier decrease the value of dtMOPA, while decreases in the fluorine level in the master oscillator increase dtMOPA. One skilled in the art will appreciate that while dtMOPA represents the difference in the discharges in the two chambers, the effect of decreasing fluorine in each chamber on dtMOPA, and thus the illustrated curves, are substantially independent of each other for the purpose of calculating the amount of gas to be injected into each chamber to compensate for fluorine consumption.

It will be seen that there is a reference value $dtMOPA_{REF}$, which represents the optimum value of dtMOPA for the laser in question. As the fluorine concentration changes, the actual value of dtMOPA may go down to $dtMOPA_{ACT(1)}$ or up to $dtMOPA_{ACT(2)}$. From this it can be seen that there is an amount of an inject $\Delta F_2$ that is called for to return a $dtMOPA_{ACT}$ back to the desired reference value $dtMOPA_{REF}$, which may be a "negative" injection (i.e., no injection is required) $\Delta F_{2(1)}$ or a positive injection $\Delta F_{2(2)}$.

Similar plots may be made for other operating parameter relationships. One such parameter is bandwidth, which may be measured by the integral of a certain percentage of the energy contained on either side of a center wavelength of a spectrum centered on the center wavelength. The use of the integral of 95% of the energy is common and is known as E95% or simply E95. Another parameter commonly used is the common voltage applied to both chambers, for example, at the peaking capacitor of a compression head of a solid state pulsed power system (SSPPM) for each chamber, and the energy output of one of the chambers. For the master oscillator chamber this is designated as $E_{MO}$. Other suitable parameters and/or combinations of parameters for estimating the consumed fluorine will be apparent to those of skill in the art.

Some previous efforts to manage injects have used fixed amounts of the M2 gas mix (as from gas bottle 112 in FIG. 1), while calculating the amount of the M1 gas mix, which contains the fluorine desired for replenishment. In some cases, the injects to the master oscillator are calculated solely or primarily from dtMOPA, while the injects to the power amplifier may be calculated from $E_{MO}$ and the discharge voltage. In some prior art systems, such calculations are performed approximately every 30 seconds.

However, it is seen from observations that while fluorine is consumed in both laser chambers, it is consumed much more slowly in the power amplifier. In fact, the rate of consumption of fluorine in the master oscillator is typically greater than that in the power amplifier by about an order of magnitude.

From this it has been determined that gas replenishment of the power amplifier may be simplified by injecting fixed amounts of fluorine, and thus fixed amounts of M1 gas mix, into the chamber at appropriate intervals rather than measuring or estimating the actual fluorine consumption in the power amplifier. While such fixed injects have been tried in single chamber systems before, it is believed that this has not previously been done in dual chamber laser systems.

Figure 3:
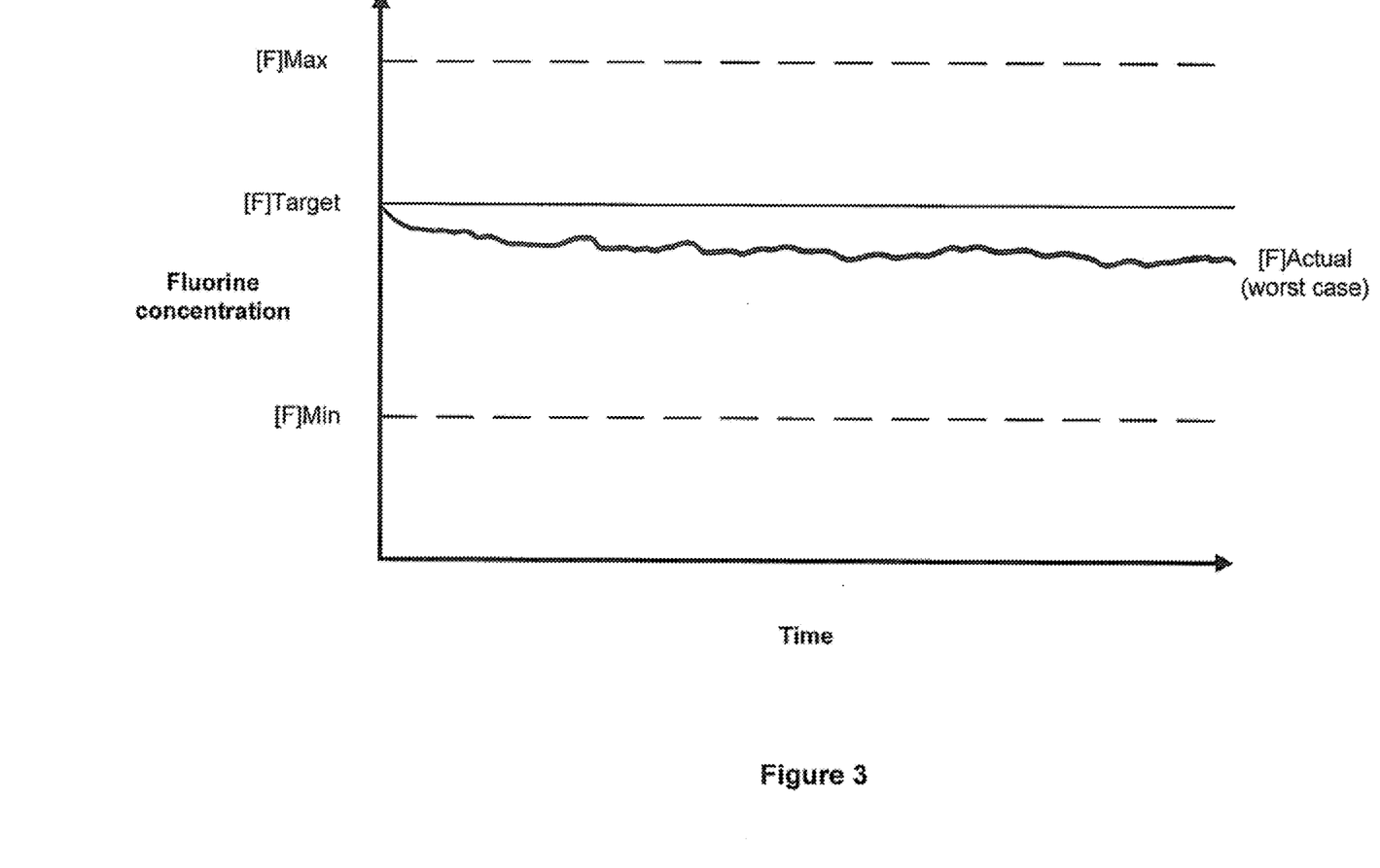
FIG. 3 is a graph showing a target fluorine concentration compared to an exemplary actual fluorine concentration over time in the laser chamber of a power amplifier in a MOPA excimer laser in one embodiment.

FIG. 3 is a graph showing a target fluorine concentration compared to an exemplary actual fluorine concentration over time in the laser chamber of a power amplifier in a MOPA excimer laser in one embodiment.

There is an optimum concentration of fluorine that will provide the best operation of the power amplifier; this level is represented by the value $[F]_{TARGET}$. However, the laser will function within acceptable operating parameters with a fluorine concentration between the lower value of $[F]_{MIN}$ and the higher level of $[F]_{MAX}$. One possible actual value of fluorine $[F]_{ACTUAL}$ is also illustrated that might represent a "worst case" scenario.

There is ongoing consumption of fluorine in the power amplifier laser chamber, and so if no additional fluorine is introduced, the actual fluorine level in the power amplifier laser chamber will decrease over time, resulting in the initial drop from the target level in $[F]_{ACTUAL}$, as well as a continuing bias downward in the actual fluorine level. However, as long as sufficient fluorine is introduced into the system to keep the actual level $[F]_{ACTUAL}$ above the minimum tolerable level $[F]_{MIN}$, the laser will continue to function within acceptable parameters.

The consumption rate of the fluorine is typically slightly variable, and there are also some slight variations in the amount of gas delivered to the chamber by injects even when the injects are intended to contain constant amounts of fluorine. These variations may be due to such factors as the variability of the actual gas concentrations in the bottles, the drop in bottle pressure as the bottles are used for refills or injects, and different pressures when depleted bottles are replaced with full bottles.

Further, the pipes from the valves to the laser chambers are also used to bleed gas from the laser chambers when necessary, so that when it is desired to pump gas into a laser chamber, the first thing that goes into the chamber is the leftover gas from either the last bleed or the last fill or inject that is already in the pipe. This leftover gas creates another offset that must be accounted for. Still other factors affecting fluorine consumption exist that will be apparent to those of skill in the art.

Concentration of fluorine $[F]_{SS}$ in the power amplifier laser chamber in steady state operation is given by $$[F]_{SS} = \frac{\Delta P_{M1} - Wt}{\Delta P_{M2}}$$

where $\Delta P_{M1}$ is the amount of M1 mix containing fluorine that is injected into the laser chamber, $\Delta P_{M2}$ is the amount of M2 mix that is injected, W is the estimated consumption rate of fluorine, and t is the elapsed time or accumulated pulses. Note that this equation and those below are for the laser chamber only, and ignores any gas in the pipes as mentioned above that may be pushed into the chamber during an inject. One of skill in the art will appreciate how to take the leftover gas in the pipes into account in these equations.

It will thus be seen that if there is no consumption of fluorine at all, i.e., if W is zero, the value of $F_{SS}$ would simply be $\Delta P_{M1}/\Delta P_{M2}$. Accordingly, the values of $\Delta P_{M1}$ and $\Delta P_{M2}$ are selected so that the target concentration $[F]_{TARGET}$ is given by:

$$[F]_{TARGET} = \Delta P_{M1}/\Delta P_{M2}.$$

From this, the "error" in fluorine concentration $[F]_{ERROR}$ can be seen to be $$[F]_{ERROR} = [F]_{TARGET} - [F]_{SS}$$

While this assumes that the consumption rate W=0 as above, in actuality W has a small finite value, but one that is sufficiently low to allow for injects of a fixed amount of fluorine, and thus M1 gas mix, to keep $[F]_{ACTUAL}$ near $[F]_{TARGET}$. One of skill in the art will appreciate how the rate of fluorine consumption W, and thus the appropriate size of the inject, may readily be calculated for a given laser. While FIG. 3 illustrates a fluorine concentration $[F]_{ACTUAL}$ that is below the value of $[F]_{TARGET}$, in practice an effort is made to keep the actual fluorine concentration $[F]_{ACTUAL}$ centered around the value $[F]_{TARGET}$. However, as illustrated, there is a margin for error that allows the value of $[F]_{ACTUAL}$ to drop and still keep the power amplifier laser chamber operating within acceptable bounds.

The described approach of a fixed inject greatly simplifies operation and control of the power amplifier. However, such a fixed injection will not work for a master oscillator laser chamber. The consumption rate W for the master oscillator laser chamber is typically an order of magnitude or more greater than that of the power amplifier laser chamber. Further, the consumption rate in the master oscillator is much more variable than that of the power amplifier. For example, the actual consumption rate may vary widely, as much as 50% or more in either direction, from the mean consumption rate in the master oscillator.

This increased consumption rate in the master oscillator, and the greater variability of the consumption rate, results in a potential $[F]_{ERROR}$ for the master oscillator that is so large that the master oscillator might not stay within the acceptable bounds of operation if a fixed inject of fluorine were to be used. Further, even with calculated injects, the variation is large enough that feedback is typically used to insure that the bounds of operation are not exceeded. For this reason, in the present embodiment an algorithm is used to calculate each inject to the master oscillator as described above, as well as a feedback loop. Such a system is described in U.S. Pat. No. 7,835,414, owned by the assignee of the present application.

As above, it is believed that in the prior art an attempt was made to do a fixed inject in a single chamber laser. However, it is believed that in such systems only the halogen containing gas, i.e., M1, was injected, and then the gas in the laser chamber was bled to reduce the overall pressure in the chamber down to an intended pressure. Such a technique will thus eventually result in a chamber that contains only the halogen containing gas mix M1, which has a halogen concentration far too high for laser operation, and the laser, whether single or double chamber, will stop operating long before that occurs.

Thus, the prior art "single chamber fixed inject" would only work for a relatively short period of time, until the fluorine concentration in the laser chamber passed the maximum acceptable concentration for operation. By contrast, the present technique is intended to keep the fluorine level at an approximately constant level, and thus to allow the laser to run for an extended period, perhaps indefinitely.

Further, in the prior art two chamber systems discussed above, in which the injects to both chambers are calculated, the fluorine level in the power amplifier would continue to rise, causing an increase in the value of dtMOPA; this is believed to be an artifact of both the algorithms used and the physics of the laser. As above, the value of dtMOPA is determined based upon the firing of both chambers and is then used to calculate the amount of fluorine to be injected into the power oscillator.

As the value of dtMOPA increased, the algorithm based on dtMOPA used to calculate the inject to the master oscillator resulted in an increased amount of fluorine also being injected into the master oscillator. This phenomenon is known as "coupling" between the two chambers.

However, as discussed above, the master oscillator is more sensitive to the level of fluorine than the power amplifier, and this coupling of the two chambers can thus result in degradation of the performance of the master oscillator as a direct result of the increased fluorine level in the power amplifier. The fixed inject method described herein thus also has the advantage that this coupling is eliminated, and the resulting problem of enrichment of the fluorine level in the master oscillator as a result of fluorine enrichment in the power amplifier is eliminated.

Tests have been run of the described method of injecting fixed amounts of fluorine-containing gas into the power amplifier of an excimer laser over a period of over 4 billion shots. A Cymer model XLR-500 excimer laser was used, running with an energy target of 10 mJ at a 40% average duty cycle.

Each chamber received an inject approximately every 1 million shots, with the injects to the master oscillator staggered from those to the power amplifier as described above. The master oscillator received a fixed M2 inject, and an M1 mix containing fluorine as calculated based upon the dtMOPA timing as described in U.S. Pat. No. 7,835,414. The power amplifier received a fixed M2 inject and a fixed inject of M1 mix.

Figure 4:
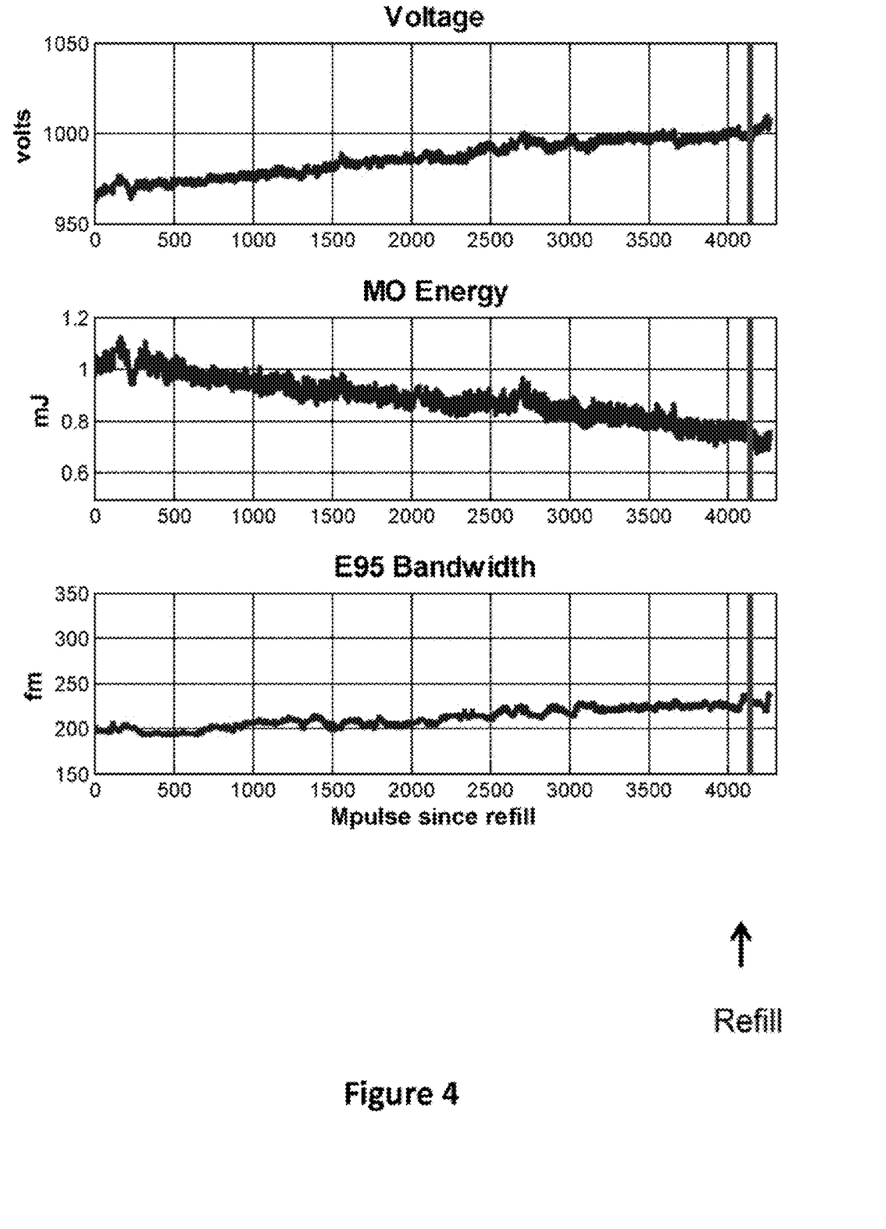
FIG. 4 illustrates graphs of a test measuring the voltage, the master oscillator energy and the E95 bandwidth in an excimer laser over a period of operation in one embodiment.

FIG. 4 illustrates graphs of a test measuring the voltage, the master oscillator energy and the E95 bandwidth in an excimer laser over a period of operation exceeding 4 billion pulses (4000 M pulses on the horizontal axis). A complete refill of the laser chambers was performed after about 4.1 billion pulses.

As shown in FIG. 4, measurements found a generally steady increase in voltage and E95 bandwidth, and a decreasing MO energy, in line with expectations for normal aging of such a system. Significantly, there were no observed transients across the refill, i.e., all three signals were stable and the trend lines continued as they had before the refill.

The lack of noticeable changes in these measurements as a result of the refill indicates that the gas in the chambers after the refill was of substantially the same mix as before the refill, and thus that there was an extremely consistent control of the gas content in the chambers up until the time of the refill. This is in line with the expectations of the present method as described herein.

These results confirm that the described method is able to keep the actual fluorine level $[F]_{ACTUAL}$ near the desired level $[F]_{TARGET}$ in the power amplifier, and that this, along with the decoupling between the power amplifier and master oscillator described above, allows for much longer continuous operation of dual chamber gas discharge laser systems than has been possible with the calculated injects of prior systems. Where such prior systems typically call for refills after approximately every 1 billion pulses, the above experiment shows that the described fixed inject method should allow for at least 4 billion pulses between refills. For typical lithographic applications, this would mean an operating time of over 3 between refills, rather than less than approximately a month.

Figure 5:
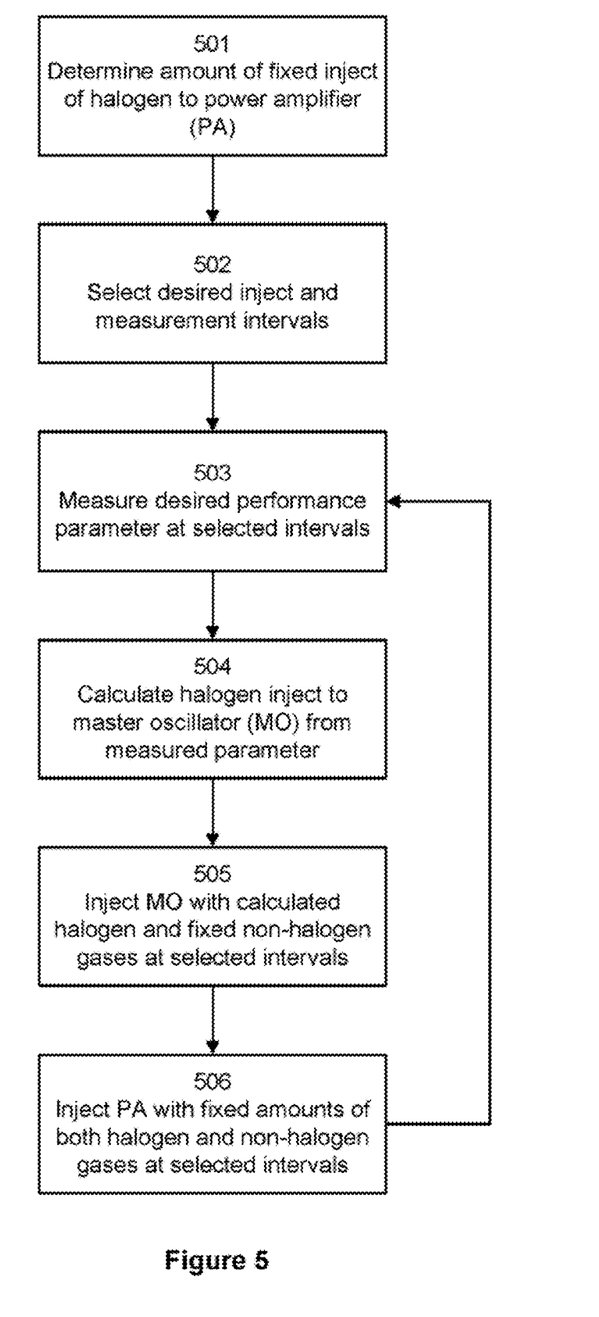
FIG. 5 is a simplified flow chart showing the steps of a method of gas replenishment in a dual chamber gas laser, such as a MOPA excimer laser, according to one embodiment.

FIG. 5 is a simplified flow chart showing the steps of a method of gas replenishment in a dual chamber gas laser, such as a MOPA excimer laser, according to one embodiment.

At step 501, the amount of halogen containing gas to be injected into the power amplifier laser chamber at each inject event is determined, as described above. At step 502, the desired intervals are determined for inject events, and for measurement of one or more laser parameter(s), such as dtMOPA, bandwidth, etc., to be used to determine the amount of halogen to be injected into the master oscillator. As above, these need not be and are typically not the same; for example, the intervals between inject events are typically measured in shots or pulses, while the parameter(s) may be measured every 30 seconds or at some other interval of time rather than shots.

Next, the selected parameter(s) is (are) measured at the selected intervals at step 503, and the amount of halogen containing gas to be injected into the master oscillator calculated based upon such parameter(s) at step 504. As above, the amount of halogen containing gas is calculated to replace the estimated consumption of halogen in the master oscillator.

At step 505, the calculated amount of halogen containing gas is injected into the master oscillator, along with a fixed amount of non-halogen containing gas, while at step 506, the power amplifier is injected with both a fixed amount of halogen containing gas and a fixed amount of non-halogen containing gas.

Once an inject event is completed, the system returns to step 503, continuing to measure the desired system parameter(s) at the selected interval, and determining when the next inject event should occur, for example, by counting the number of shots taken by the laser.

The disclosed method and apparatus has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that, while the preferred embodiment is a master oscillator-power amplifier multi-chambered excimer or molecular fluorine gas discharge laser system ("MOPA") the system may also be configured to have other oscillator/amplifier configurations, such as a master oscillator-power oscillator ("MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to corner any such oscillator stage and the term amplifier chamber or stage is broad enough to cover any such amplifier stage.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
   a master oscillator having a laser chamber containing a lasing medium gas comprising a halogen;
   an amplifies having a laser chamber containing a lasing medium gas comprising a halogen;
   a gas replenishment system including a controller executing a replenishment scheme at inject opportunities occurring at regular intervals, the replenishment scheme comprising:
      injecting into the master oscillator laser chamber at each inject opportunity gas containing a fixed quantity of a non-halogen containing gas, and during at least one inject opportunity a halogen containing gas in a calculated amount; and
      injecting into the amplifier laser chamber at each inject opportunity a fixed non-zero amount of the halogen containing gas which is not based upon feedback of a measurement or continuous estimation of the actual consumption of the halogen containing gas in the amplifier chamber.

2. The dual chamber gas discharge laser light source of claim 1 wherein the replenishment scheme further comprises injecting into the amplifier laser chamber at each inject opportunity a fixed amount of the non-halogen containing gas.

3. The dual chamber gas discharge laser light source of claim 1 wherein the halogen comprises fluorine.

4. The dual chamber gas discharge laser light source of claim 1 wherein the regular intervals for inject opportunities are determined by factors comprising one or both of elapsed time and shot count.

5. The dual chamber gas discharge laser light source of claim 1 wherein the amount of halogen containing gas injected into the master oscillator laser chamber is calculated by estimating the amount of halogen as that has been consumed in the master oscillator laser chamber.

6. The dual chamber gas discharge laser light source of claim 5 wherein the amount of halogen gas that has been consumed in the master oscillator laser chamber is estimated based upon a change in an operating parameter of the laser light source.

7. The dual chamber gas discharge laser light source of claim 6 wherein the operating parameter is the discharge timing differential between the master oscillator and amplifier.

8. The dual chamber gas discharge laser light source of claim 6 wherein the operating parameter is the bandwidth of the laser light source.

9. The dual chamber gas discharge laser light source of claim 6 wherein the operating parameter is E95.

10. The dual chamber gas discharge laser light source of claim 1 wherein the laser light source is an excimer laser source.

11. A method of replenishing gas in a dual chamber gas discharge laser light source having a master oscillator and an amplifier, each of the master oscillator and amplifier having a laser chamber containing a lasing medium gas comprising a halogen, the method comprising the steps of:
    selecting a plurality of inject opportunities occurring at regular intervals;

injecting into the master oscillator laser chamber at each inject opportunity gas containing a fixed quantity of a non-halogen containing gas, and during at least one inject opportunity a halogen containing gas in a calculated amount; and injecting into the amplifier laser chamber at each inject opportunity a fixed non-zero amount of the halogen containing gas which is not based upon feedback of a measurement or continuous estimation of the actual consumption of the halogen containing gas in the amplifier chamber.

12. The method of replenishing gas of claim 10 further comprising injecting into the amplifier laser chamber at each inject opportunity a fixed amount of the non-halogen containing gas.

13. The method of replenishing gas of claim 10 wherein the halogen comprises fluorine.

14. The method of replenishing gas of claim 10 wherein selecting the plurality of inject opportunities further comprises selecting the regular intervals based upon factors comprising one or both of elapsed time and shot count.

15. The method of replenishing gas of claim 10 further comprising calculating the amount of halogen containing gas to be injected into the master oscillator laser chamber by estimating the amount of halogen gas that has been consumed in the master oscillator laser chamber.

16. The method of replenishing gas of claim 15 wherein estimating the amount of halogen gas that has been consumed in the master oscillator laser chamber further comprises basing the estimation upon a change in an operating parameter of the laser light source.

17. The method of replenishing gas of claim 16 wherein the operating parameter is the discharge timing differential between the master oscillator and amplifier.

18. The method of replenishing gas of claim 16 wherein the operating parameter is the bandwidth of the laser light source.

19. The method of replenishing gas of claim 16 wherein the operating parameter is E95.

20. The method of replenishing gas of claim 10 wherein the laser light source is an excimer laser source.

21. A non-transitory computer-readable medium having embodied thereon a program, the program being executable by a processor to perform a method of replenishing gas in a dual chamber gas discharge laser light source having a master oscillator and an amplifier, each of the master oscillator and amplifier having a laser chamber containing a lasing medium gas comprising a halogen, the method comprising the steps of:

selecting a plurality of inject opportunities occurring at regular intervals;

injecting into the master oscillator laser chamber at each inject opportunity gas containing a fixed quantity of a non-halogen containing gas, and during at least one inject opportunity a halogen containing gas in a calculated amount; and injecting into the amplifier laser chamber at each inject opportunity a fixed non-zero amount of the halogen containing gas which is not based upon feedback of a measurement or continuous estimation of the actual consumption of the halogen containing gas in the amplifier chamber.

* * * * *